No. 647,142. Patented Apr. 10, 1900.
U. E. MAILLE.
BRAKE MECHANISM FOR ELECTRIC CARS.
(Application filed Dec. 29, 1899.)

(No Model.)

WITNESSES. INVENTOR.
Charles T. Hannigan. Uldereque E. Maille
Annie E. Perce. by Warren R. Perce
Atty.

THE NORRIS PETERS CO., PHOTO-LITHO., WASHINGTON, D. C.

UNITED STATES PATENT OFFICE.

ULDEREQUE E. MAILLE, OF PROVIDENCE, RHODE ISLAND.

BRAKE MECHANISM FOR ELECTRIC CARS.

SPECIFICATION forming part of Letters Patent No. 647,142, dated April 10, 1900.

Application filed December 29, 1899. Serial No. 741,928. (No model.)

*To all whom it may concern:*

Be it known that I, ULDEREQUE E. MAILLE, a citizen of the Dominion of Canada, residing at Providence, in the county of Providence and State of Rhode Island, have invented certain new and useful Improvements in Brake Mechanism for Electric Cars, of which the following is a specification, reference being had therein to the accompanying drawings.

Like letters indicate like parts.

Figure 1:
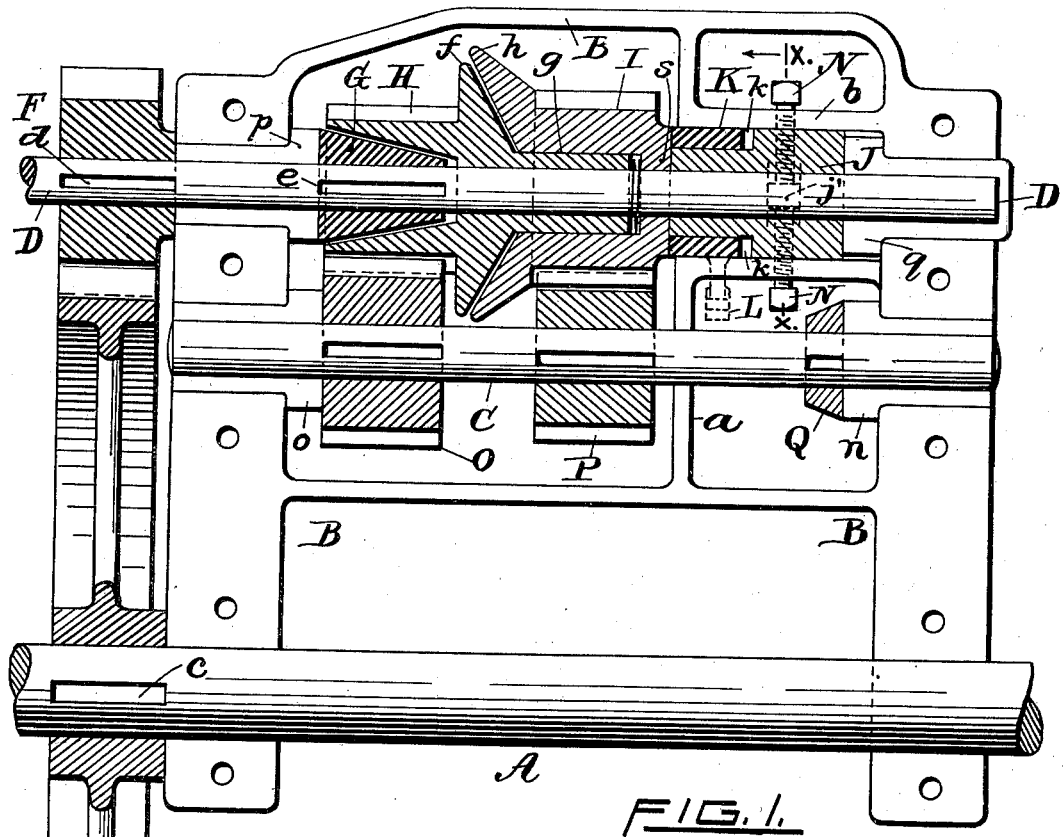
Figures 2, 3, 4:
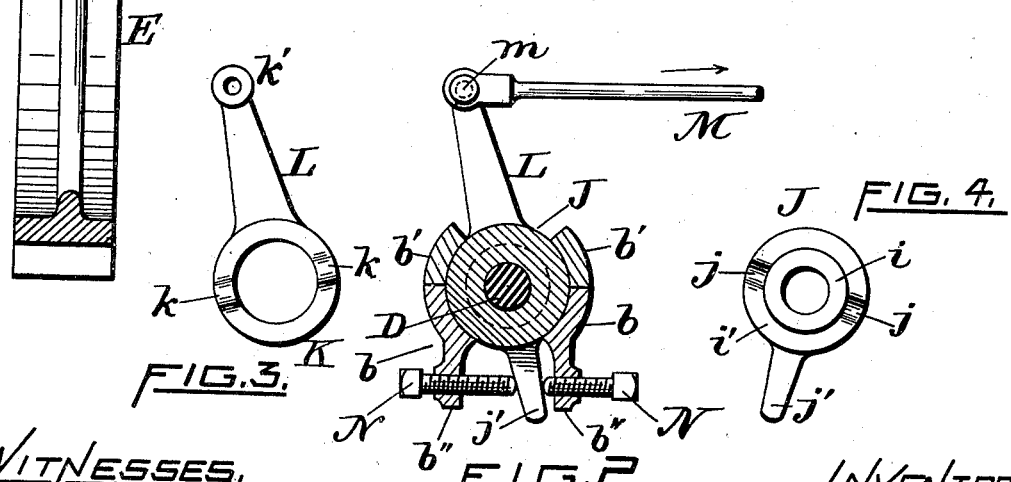

Figure 1 is a view of my invention, partly in top plan and partly in horizontal section. Fig. 2 is a sectional view as seen on line $x\ x$ of Fig. 1, the adjusting-screws, however, being shown in elevation. Fig. 3 is a side elevation of the cam collar or disk and its connected arm. Fig. 4 is a side elevation of the adjustable socketed sleeve with which said cam collar or disk is in operative contact.

My invention relates to the brake mechanism of electric cars, but is also applicable to steam-cars or any vehicle which has wheels rotating with its axles.

My invention is an improvement on the invention described and shown in my pending application for Letters Patent, Serial No. 723,094; and it consists of the novel construction and combination of the several elements hereinafter particularly described, and specifically set forth in the claims.

In the drawings, A is the axle of an electric car and is rotated by the electric motor in the usual manner. The axle A has on its ends the car-wheels, fastened to it and rotating therewith.

B is the lower portion or section of a case, in the sides of which in suitable journals the axle A and also the shafts C and D are rotatably mounted. A partition $a$ extends across the case B, as shown, and a semitubular cover $b$ is also provided. A similar portion or section (not shown) of a case having like journals, partition, and simitubular sleeve completes the housing of the shafts and gears.

On the axle A is a geared wheel E, which is of a diameter less than that of the car-wheels. Said geared wheel E is fixed by the key or spline $c$, so that it rotates with said axle. The geared wheel E engages with the gear F, which by means of a key or spline $d$ is fastened upon the shaft D. This shaft D extends through the case B and out of it on the side on which is the gear F, said gears E and F being outside of the case B, as shown.

On the shaft D is the fixed cone G, fastened thereon by the key or spline $e$. A geared wheel or friction member H is loosely mounted on the shaft D and consists of three integral portions—a gear having cogs on its periphery, but made with a central conical socket of a size and shape to receive the cone G, but exceeding in its depth the length of the cone, a flange $f$, having one surface beveled into a conical form, and a cylindrical tube or sleeve $g$. Another geared wheel or friction member I is loosely mounted on the sleeve $g$ of the wheel H, and consists of a gear having cogs on its periphery and a flanged end $h$, with a conical recess of a size and shape to receive the conical flange $f$ of the gear H.

A sleeve J is loosely mounted on the shaft D, but is held from rotation or movement by means extending from the cover $b$, as shown, or in any other suitable manner. This sleeve J is reduced in diameter one-half its length, as seen at $i$, thus forming midway an annular face $i'$, on the surface of which latter, as seen in Fig. 4, are diametrically-arranged cam-sockets $j$, half-round in cross-section. On one side of this sleeve J is a lug or projection $j'$, extending radially outward.

On the reduced portion $i$ of the sleeve J is loosely mounted a collar K, having a lever-arm L projecting radially therefrom on one side. Said collar K has diametrically-arranged outwardly-projecting cams $k$ on one face thereof. Through an eye $k'$ a brake-rod M is mounted by means of a pin $m$.

The semitubular sleeve $b$ has an aperture at its bottom, as illustrated in Fig. 2, and is there provided with downwardly-projecting lugs $b''$, in which adjusting-screws N are mounted, whose ends bear against the lug $j'$ of the sleeve J. In the case B is also rotatably mounted the shaft C, on which are fixed the gears O and P, splined or otherwise secured to said shaft, so as to rotate with it. The partition $a$ has an aperture for the passage of the shaft C through it. On the shaft C is also the fixed collar Q. Said collar Q bears against the flange $n$ of the journal of said shaft on one side, and the gear O bears against the flange $o$ of the journal of said shaft on the other side.

The cone G bears against the flange $p$ of the journal of the shaft D on one side and the sleeve J bears against the flange $q$ of the journal of the shaft D on the other side.

The gear I is of a greater diameter than the gear H. The gear O is of a greater diameter than the gear H, but of the same diameter as the gear I. The gear P is of a less diameter than the gears O and I, but of the same diameter as the gear H.

The rotation of the axle A rotates the gear E thereon, which meshes with and turns the gear F. The rotation of the gear F rotates the shaft D and the cone G, which is secured thereto; but as the gears H and I are loosely mounted on the shaft D they do not commonly rotate therewith, and consequently the gears O P, collar Q, and shaft C do not usually rotate; but when the brake-rod M is drawn it moves the lever L and partially rotates the collar K, with which said lever L is integral, and so the rounded cams $k$, which usually are seated in the cam-sockets $j$ in the annular face $i'$ of the sleeve J, are forced out of said sockets and ride up on the annular face $i'$ of the sleeve J. The collar K is thereby moved along on the reduced portion $i$ of the sleeve J toward and against the face of the gear I. This movement of the collar K causes the gear I to slide in the same direction upon the sleeve of the gear H and to bring the inner conical recess of the flange $h$ of said gear I into contact with the conical flange or head $f$ of the gear H, whereupon said gear H is slid in the same direction and its conical recess is brought in contact with the fixed cone G on the shaft D. As soon as said cone G is thus frictionally engaged in the conical recess of the gear H said gear H is rotated by the force of the rotating shaft D and engages with the gear O of the shaft C. As the gears O P are keyed to the shaft C, the gear P is also rotated, and the gear P meshing with the gear I rotates the latter.

The frictional engagement of the gear H with the fixed cone G causes the gear H to rotate with the same speed as the gear F; but as the gear O has a larger diameter than the gear H the gear O rotates more slowly than the gear H. The gears O P being keyed to the same shaft C rotate in the same time; but as the diameter of the gear P is less than that of the gear I the gear I rotates more slowly than the gear P. The result of these different rates of rotation of the several gears is that the gear I rotates much more slowly than the gear H, and therefore the friction between the conical flange or head $f$ of the gear H and the conical recessed portion of the flange $h$ of the gear I stops the car, which while said braking mechanism is operated, as above stated, is running only by its own momentum, the electric current having been shut off.

The relative diameters of the gears, as hereinbefore specified, are not material, so long as in the construction the two flanged gears which furnish the friction-surfaces rotate with different velocities.

In the bore of the friction member I is placed a coiled spring, as shown, between the annular lip $s$ thereof and the end of the sleeve $g$ of the friction member H, which serves to keep the friction-surfaces of the flanges $f\ h$ from contact until the opposite recessed end of the friction member H is seated on the cone G and begins to rotate by reason of its engagement therewith.

As seen in Fig. 2, an aperture is formed in the upper portion of the upper semitubular sleeve (designated as $b'$ in said figure) of a width a little greater than the thickness of the lever L.

By means of the adjusting-screws N the angular direction of the lug $j'$ of the sleeve J may be regulated, and thus the position of the cam-sockets $j$ of said sleeve may be varied in their relation to the cams $k$ of the collar K, and this adjustment controls and determines the extent of the endwise movement of the collar K, caused by the movement of the brake-rod M and resulting in the sliding endwise movements of the gears I H, as described. This adjustment serves to compensate for the wear of the friction-surfaces $f$ of the friction members or brakes.

I claim as a novel and useful invention and desire to secure by Letters Patent—

1. In a brake mechanism for cars having an electric motor with a shaft rotated thereby and mounted upon proper supports, and a pair of car-wheels fastened on and rotating with said shaft, the combination therewith of a gear fastened on said shaft and having a diameter less than that of said wheels, a second rotatable shaft properly mounted and having a gear thereon engaged with the first-named gear but of a less diameter than it, a cone fixed upon said second shaft, a friction-brake mounted loosely on said second shaft and comprising a gear on one end, with a concentric, conical recess, of a size to fit upon said fixed cone, a tubular sleeve upon the other end and an intermediate circular flange with a conical surface, and a second friction-brake mounted loosely on said sleeve and comprising a gear and a circular flange which has a central and concentric recess adapted to receive the conical flange of the first-named friction-brake, a fixed sleeve mounted loosely on said second shaft and made with a reduced diameter one-half the length thereof so forming an annular face, cam-sockets in said annular face, a collar loosely mounted on the reduced portion of said sleeve and provided with a lever-arm and with cams adapted to move in and out of said sockets, a brake-rod pivotally attached to the end of said lever, a third shaft properly mounted and having fastened thereon a gear engageable with the gear of the first-named brake but of a greater diameter than it, and also having a gear fastened thereon and engageable with the gear of the second-named brake but of a less diameter than it, and also having a fixed collar adapted to resist endwise motion of said shaft, all arranged and operating substantially as and for the purpose specified.

2. In a brake mechanism for electric cars having a car-wheel axle rotated by the motor thereof and a gear on said axle, the combination therewith of a rotatable brake-shaft properly mounted and having a gear engaged by the first-named gear, a fixed cone on said brake-shaft, two rotatable, slidable and mutually engageable friction members constituting the brakes and loosely mounted on said brake-shaft, both of which friction members have gears integral therewith, respectively, and one of which has a conical recess to fit upon said cone, means mounted and slidable on said brake-shaft adapted to move said friction members into mutual frictional engagement, and an intermediate shaft properly mounted and having a fixed gear thereon engageable with the gear of one of said friction members and also having a fixed gear thereon engageable with the other of said friction members, and so arranged and of such dimensions, respectively, that said friction members rotate with different velocities, substantially as described.

3. In a brake mechanism for electric cars having a car-wheel axle rotated by the motor thereof and a gear on said axle, the combination therewith of a rotatable brake-shaft properly mounted and having a gear engaged by the first-named gear, a fixed cone on said brake-shaft, two rotatable, slidable and mutually engageable friction members constituting the brakes and loosely mounted on said brake-shaft, both of which friction members have gears integral therewith, respectively, and one of which has a conical recess to fit upon said cone, a fixed sleeve loosely mounted on said brake-shaft one half of which is of less diameter than the other half thus forming midway an annular face in which are cam-sockets, a rotatable collar mounted loosely on the reduced portion of said sleeve and having on its face cams adapted to move in and out of said cam-sockets, a lever extending from said collar and a brake-rod pivotally connected with said lever, an intermediate shaft properly mounted and held against endwise movement, a fixed gear upon said intermediate shaft engageable with the gear of one of the friction members and a fixed gear upon said intermediate shaft engageable with the gear of the other of said friction members, said gears and sliding parts being so arranged and of such dimensions, respectively, that said friction members rotate with different velocities, substantially as shown.

4. In a brake mechanism for cars having an electric motor, three shafts properly mounted, the first of which is rotatable by said motor and has fixed thereon a pair of car-wheels and a gear, the second of which shafts has fixed thereon a cone and also a gear engaged with the first-named gear and the third of which shafts has two gears fixed thereon, two friction members constituting the brakes, one of which friction members has a tubular sleeve and bore by which it is loosely mounted on said second shaft and also a gear having a central, concentric, conical recess adapted to receive said fixed cone and also a central, peripheral flange, one side of which has a conical surface, and the other of which friction members has a gear and a central, concentric bore, in which it is loosely mounted on the sleeve of the first of said friction members and also provided with a flange in which is a conical recess adapted to receive said conical flange of the first of said friction members, a fixed sleeve loosely mounted on said second shaft one half of which is of a less diameter than the other half thus forming midway an annular face in which are cam-sockets, a collar loosely mounted on the reduced portion of said sleeve and having on its face cams adapted to move in and out of said sockets, a lever extending from said collar and a brake-rod pivotally connected with the end of said lever, said gears engaging as shown and being of such relative dimensions that the two friction members are rotated in different velocities, substantially as described.

5. In a brake mechanism for cars having an electric motor, a case made in two half-sections, an upper and lower, bolted together, and having therein two semitubular covers, integral with said case, each of which has an aperture, two lugs projecting from one of said semitubular covers on the side of the aperture therein, three shafts, mounted rotatably in the side of said case in proper journals, the first of which shafts is rotatable by said motor and has fixed thereon a pair of wheels and a gear, the second of which shafts has fixed thereon a cone and also a gear engaged with the first-named gear and the third of which shafts has two gears fixed thereon, two friction members constituting the brakes, one of which friction members has a tubular sleeve and bore by which it is loosely mounted on said second shaft and also a gear having a central concentric conical recess adapted to receive said fixed cone and also a central peripheral flange one side of which has a conical surface, and the other of which friction members has a gear and a central concentric bore in which it is loosely mounted on the sleeve of the first of said friction members and also provided with a flange in which is a conical recess adapted to receive said conical flange of the first of said friction members, a sleeve loosely mounted on said second shaft one half of which is of a less diameter than the other half, thus forming midway an annular face in which are cam-sockets, a lug extending from said sleeve down through the lower aperture of the tubular cover in said case, two adjusting-screws mounted and movable through the two lugs which project from said cover and adapted by their contact with the lug of said sleeve to adjust said sleeve in position, a collar loosely mounted on the reduced portion of said sleeve and having cams on its face adapted to move in and out of said cam-sockets, a lever extending from said collar through the upper aperture of the tubular cover in said case and a brake-rod pivotally connected with the end of said lever, said gears engaging as shown and being of such relative dimensions that the two friction members are rotated in different velocities, substantially as specified.

In testimony whereof I affix my signature in presence of two witnesses.

ULDEREQUE E. MAILLE.

Witnesses:
WARREN R. PERCE,
MABEL FOSTER.